United States Patent [19]

Brass

[11] 4,104,952
[45] Aug. 8, 1978

[54] TOY CONSTRUCTION SYSTEM HAVING REUSABLE DISTENSIBLE JOINING MEMBERS

[75] Inventor: Robert L. Brass, Westport, Conn.

[73] Assignee: General Mills Fun Group, Inc., Minneapolis, Minn.

[21] Appl. No.: 756,274

[22] Filed: Jan. 3, 1977

Related U.S. Application Data

[62] Division of Ser. No. 660,320, Feb. 23, 1976, abandoned.

[51] Int. Cl.$^2$ .......................................... F16B 19/00
[52] U.S. Cl. ............................... 85/5 R; 85/DIG. 2
[58] Field of Search ...................... 29/235, 280, 451; 85/DIG. 2

[56] References Cited

U.S. PATENT DOCUMENTS

| | | | |
|---|---|---|---|
| 204,913 | 6/1878 | Pratt | 85/DIG. 2 |
| 2,426,326 | 8/1947 | Tooms | 85/DIG. 2 |
| 2,791,366 | 5/1957 | Geisler | 85/DIG. 2 |

Primary Examiner—James L. Jones, Jr.
Attorney, Agent, or Firm—Haynes N. Johnson

[57] ABSTRACT

A child's toy construction system, similar in purpose to "Erector" sets, is provided having reusable, distensible "rivets" instead of nuts and bolts, and a rivet "gun" to provide a feeling of authenticity in use.

The system includes plates and bars to be joined together to create different structures. They are joined by use of the rivets passing through aligned holes in the plates and bars.

The rivets are formed of bullet-shaped, soft distensible rubber pieces having a bore passing lengthwise through the rivet, but being closed at the leading end. The rivets have an outside diameter greater than the diameter of the holes, when the rivets are in their relaxed, undistended condition, and will, therefore, when not distended, expand to fill the holes and secure the pieces together. Their diameter is less than that of the holes when they are longitudinally distended. The base of the rivets is larger than the holes and includes an undercut gripping shoulder.

Accordingly, the rivets may be inserted into and removed from the holes when distended. A "rivet gun" is provided for that purpose, having means to grip the shoulder and insert a stiff wire into the bore to distend (stretch) the rivet for insertion or removal. It may have a trigger linkage to "fire", releasing the rivet and so adding greater authenticity.

3 Claims, 11 Drawing Figures

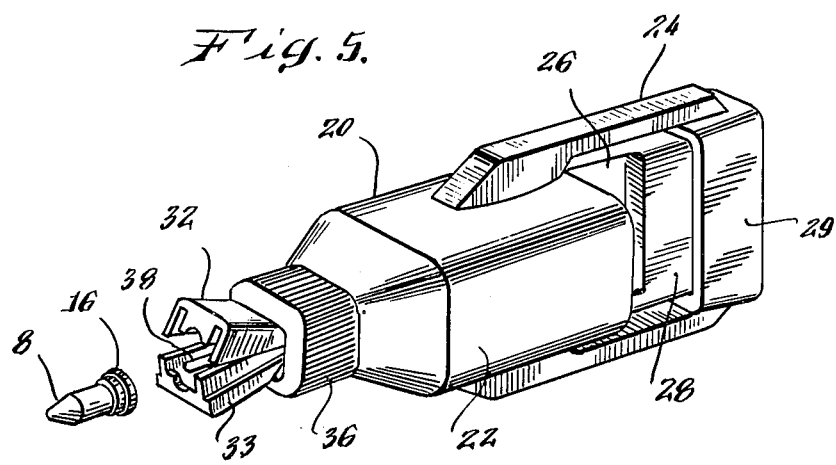
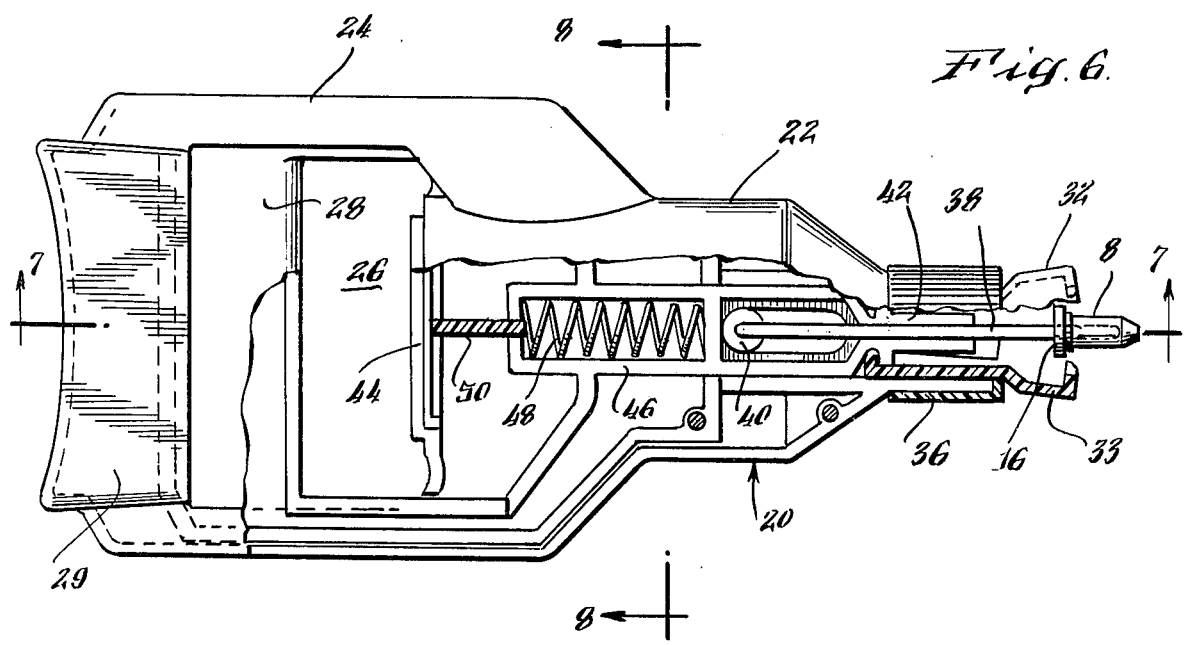
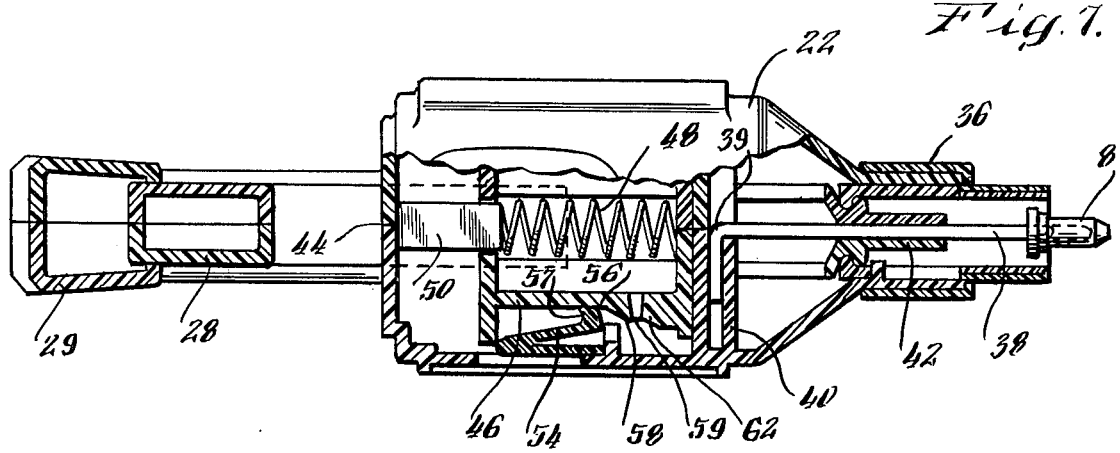

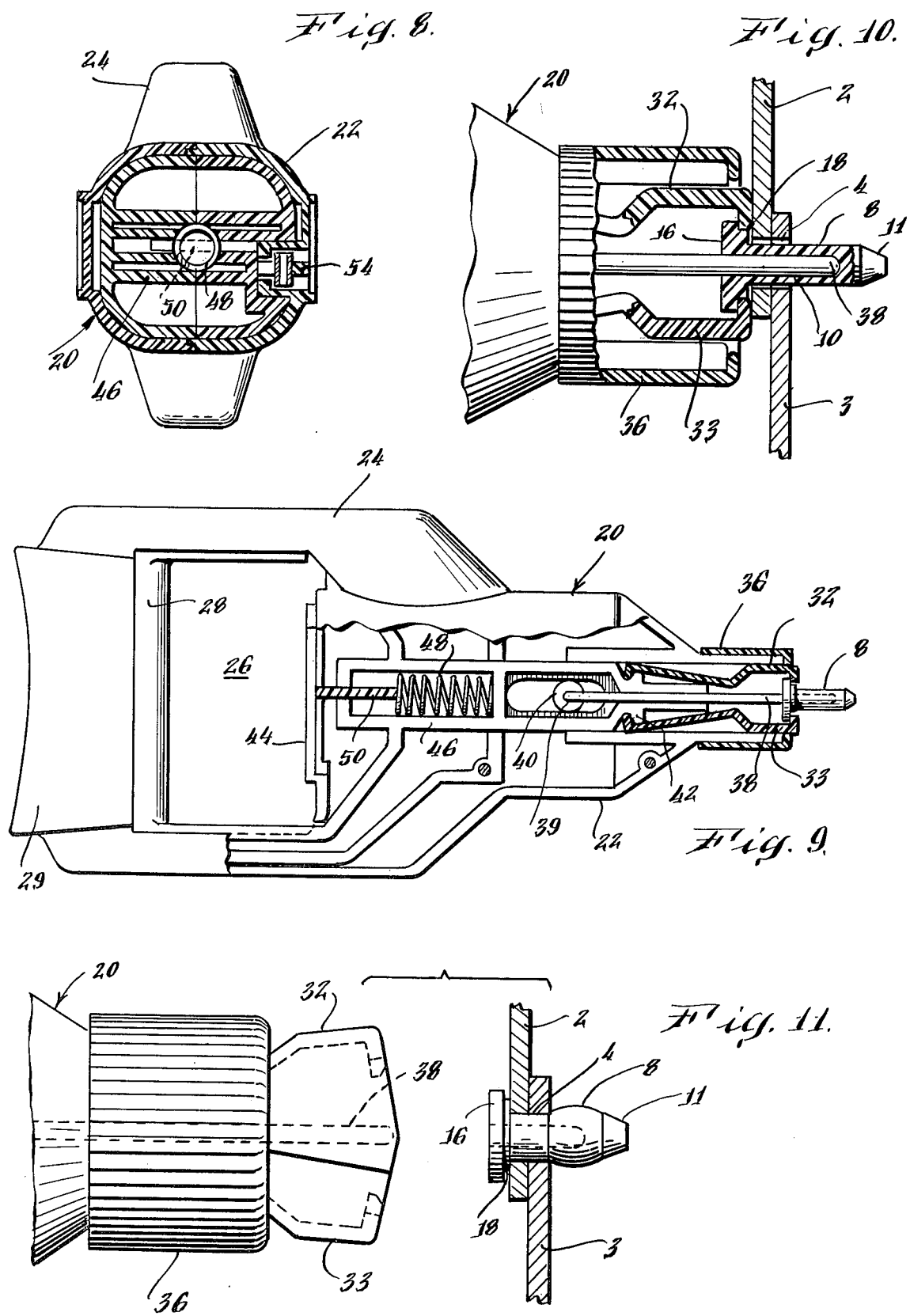

TOY CONSTRUCTION SYSTEM HAVING REUSABLE DISTENSIBLE JOINING MEMBERS

This is a division of application Ser. No. 660,320, filed Feb. 23, 1976 now abandoned.

BACKGROUND OF THE INVENTION

Creative toys, allowing a child to construct various items, such as boxes, small houses, bridges, and the like have been in existence for many years. Perhaps one of the oldest and most popular has been the so-called "Erector" set which includes a series of plates and bars with holes in them which may be joined together with nuts and bolts. Other systems use things such as wooden pegs to join the units together.

Though such systems are valuable educationally in that they teach a child manipulative skills, they lack a certain degree of authenticity in that the full-size structure normally seen by a child are not put together by "authentic" means.

By contrast to toys, full-size construction often uses riveting techniques. Though done industrially, riveting is not something a child can do, both because of the needed equipment and the inherent danger. Also, riveting is not normally a reversible process; and, when dealing with construction toys, a toy system is desirable that can be put together and taken apart repeatedly. The present system simulates rivets in a manner that may be used by the child.

Prior art patents showing various construction toys include Sherman Pat. Nos. 1,860,627, Gilbert 1,996,722, Tooms 2,426,326, Fischman 2,826,000, and Onanian 3,195,266. Patents relating to resilient joining means themselves include Ranney 1,456,403, Peirson 1,974,160, and Schneible 2,172,132.

SUMMARY OF THE INVENTION

The present construction system of my invention is one in which a child may join bars, plates, and the like together to construct various objects. Each of the bars and plates being joined has one or more holes in it of uniform size. They are joined by use of a reusable soft rubber "rivet" which may be inserted into and withdrawn from the holes.

The rivet is generally in the shape of a bullet having an outer shaft diameter slightly larger than the diameter of the holes and a length greater than the thickness of any two plates or bars that are to be joined. It has a bore extending from and through the base longitudinally to the upper rounded end, but the end itself is closed. The base of the rivet is a stepped flange or shoulder having its greatest diameter near the end and a lesser diameter away from the end. The lesser diameter is also greater than the diameter of the holes.

The rivet is made of soft elastomeric material, such as rubber. If stretched by inserting a thin, stiff wire within the bore, the rivet is elongated (distended) and the outer diameter of the rivet becomes less than the diameter of the holes, thus permitting the rivet to be inserted within or removed from the holes. Removal of the wire allows the rivet to assume its normal shape and diameter; and so, when within the holes, the rivet serves to hold plates or bars together.

When the rivet is to be distended, the shoulder at the base of the rivet is gripped to hold the base end and the wire enters the bore to distend the rivet, i.e., stretches it longitudinally. Consequently, the shoulder must be of sufficient strength to be gripped without flexing (and so being released) under the pressure of the wire being forced through the bore of the rivet. The undercut, stepped portion of the rivet flange (shoulder) serves to allow gripping means to fit between the flange and the plate or bar during insertion and removal of the rivet.

A rivet gun is provided which has clamping jaws adapted to grip the flange of the rivet and means insert a wire to distend the rivet. The gun includes internal linkage so that a trigger mechanism may be pulled and cause a pair of jaws to grasp the rivet's shoulder and a stiff wire to be pressed into the bore of the rivet to distend it. Additional actuation of the trigger will release the wire, allowing distension to cause the diameter of the rivet to expand to its normal size. The gun may then be removed from the rivet.

DESCRIPTION OF THE DRAWINGS

FIG. 5 is a rivet gun of a type that may be used with my invention. It is in the open position, ready to receive a rivet for installation.

FIG. 6 is a side view of the gun of FIG. 5 partially cut away in section showing how the rivet is inserted into the gun.

FIG. 7 is a view on lines 7—7 of FIG. 6 showing the internal workings of the rivet gun including its spring mechanism, catch mechanism, and wire for distending the rivet.

FIG. 8 is a sectional end view cut through FIG. 6 on lines 8—8, showing the spring structure and means for compressing the spring.

FIG. 9 is a section of the rivet gun, showing a rivet being held in its distended position.

FIG. 10 is an enlarged view of the end of the rivet gun holding the rivet as it inserts the rivet into the holes to connect a plate and a bar.

FIG. 11 shows a rivet in position securing a plate and bar together and the end of the rivet gun as it would appear just before or just after use.

DETAILED DESCRIPTION OF THE INVENTION

The Assembly

Figure 1:
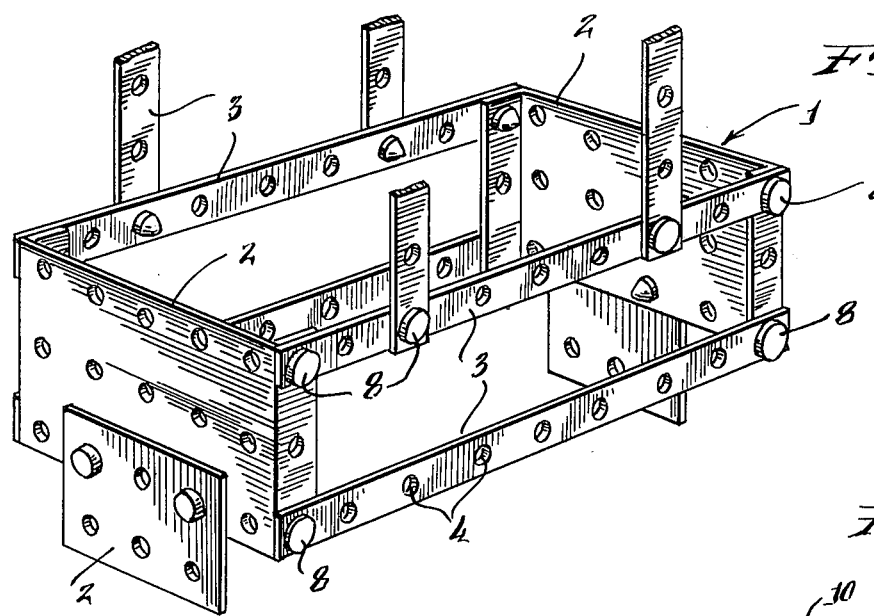
FIG. 1 is a perspective view of a partially assembled structure made according to the toy construction system. It shows a series of plates and bars held together by rivets.

Portions of an assembled structure are shown in FIGS. 1, 2, 3, and 11.

The toy construction system 1 is made up of a series of plates 2 and various bars 3. Each of the plates and bars includes a series of holes 4 therein.

The plates and bars are joined together with a type of reusable rivet 8. Rivet 8 is made of a soft, elastomeric material, such as rubber, and includes a shaft or body 10 of substantially uniform cross-section and tapered at one end 11. A bore 12 extends longitudinally of the shaft from one end to a point 14 proximate to the taper 11.

Rivet 8 has a generally coaxial base 16 surrounding the end opening of bore 12 and being essentially transverse to it. Base 16 is preferably flat on its outer surface but includes a step or shoulder 18 of lesser diameter than base 16. Step 18 has a width approximately equal to the thickness of the holding claws on the rivet gun (described below). The body 10 of the rivet 8 has a relaxed length greater than the combined thickness of the base 16 and shoulder 18.

The normal outer diameter of shaft 10 is slightly greater than the diameter of holes 4. The tapered end 11 is of lesser diameter than holes 4. The diameter of inner step 18 is likewise greater than the diameter of holes 4 and is greater than the diameter of shaft 10. Though the tapered portion 10 could be inserted into one of holes 4 by hand, it would be difficult to insert the remainder of the rivet body 8 into the hole because it is made of soft rubber-like material. Yet, the very softness and resilience which makes hand insertion difficult turns out to be an advantage, providing for easy distensibility.

Figure 3:
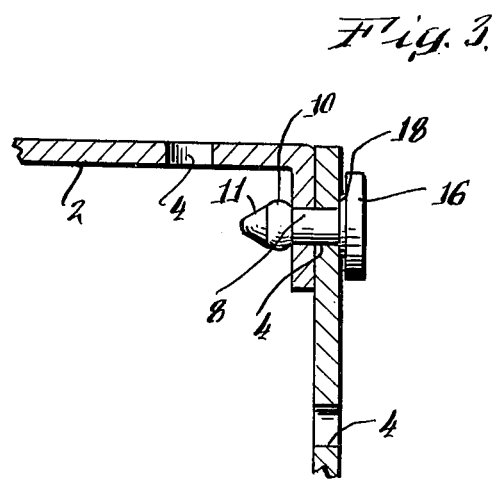
FIG. 3 is an enlargement of one corner of FIG. 2 showing details of a rivet joining a plate and a bar.
Figure 2:
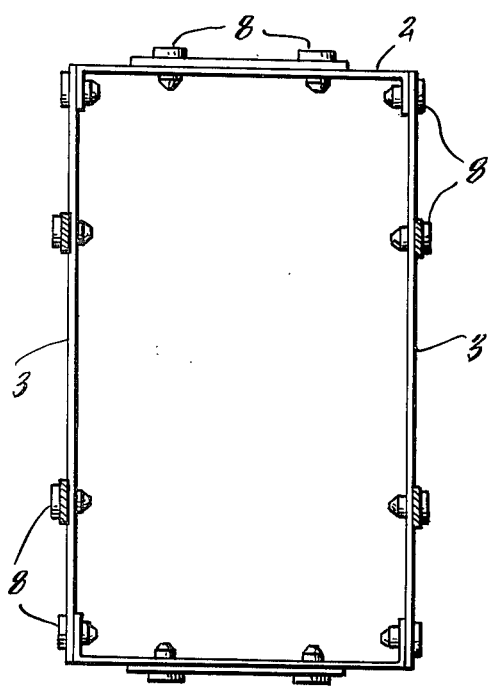
FIG. 2 is a top plan view of the structure of FIG. 1 giving more details of the assembly.
Figure 4:
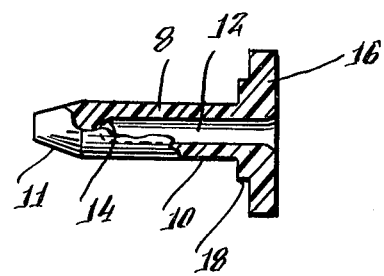
FIG. 4 is a side view of one of the rivets used for the construction. It has been partially cut away to show its internal structure.

Once rivet 8 is in position in one of holes 4, as particularly shown in FIGS. 3 and 11, several things will be noted: the portion of shaft 10 that has passed completely through hole 4 to the other side has returned to its normal size, i.e. it is wider than the diameter of hole 4. The portion of shaft 10 within hole 4 has been constricted from expanding to its normal diameter and, therefore, presses frictionally against the inner surfaces of holes 4. Base 16 and its stepped portion 18, being of greater diameter than hole 4 have not been pressed into the hole, but remain outside it. Step 18 serves to hold the bulk of base 16 slightly removed from the outer surface of the plate or bar 3 to which it is proximate.

Rivet 8 is positioned within a hole by being elongated or distended with the insertion of a rod or wire into bore 12 with sufficient force to cause the shaft 10 to elongate. Once elongated, the diameter of shaft 10 is reduced to one smaller than the diameter of holes 4 and so the rivet may pass through one of holes 4. Accordingly, dimensioning of rivet 8 should be such, relative to the materials used, that shaft 10 is greater than hole 4 when not distended, is less than hole 4 when distended, and can withstand the forces necessary to permit adequate distension to reduce the diameter of the rivet. Thus, base 16 has to be of sufficient strength and rigidity to be held while the stiff wire is pushed into bore 12 with sufficient force to enable the distension of rivet 8 to the point where the diameter of shaft 10 is sufficiently reduced. Comparably, the strength of the tapered end portion 11 must be adequate to withstand the forces exerted by the wire without bursting.

The Rivet Gun

In order to insert the rivet 8 in one or more of the holes 4, it is necessary to stretch it longitudinally, i.e., distend it, so that the external diameter of the rivet is temporarily reduced. This is done by grasping the base or shoulder 16 outside step 18 and holding it while forcing a stiff wire or rod down bore 12 to a sufficient extent to distend the rivet and reduce its diameter to less than the diameter of hole 4. This could, of course, be done by hand. It is much more readily done and adds more interest to the toy construction system to have some form of "rivet gun" that does this. The rivet gun should be of a type which can be used both to insert the rivets and to remove them.

In essence, the rivet gun to be used is any device which can grasp the base of the rivet and at the same time insert a stiff wire through the bore of the rivet with sufficient pressure to distend the rivet. It should also be able to grasp a rivet when it is in a hole 4, insert the wire, and so distend the rivet to enable it to be removed. For best operation, it is advisable to have an undercut portion in the base, i.e. step 18, so that the base gripping means can fit between the base and the bar or plate being "riveted".

As noted above, due to the nature of the rivet, it is difficult to push the rivet into the hole by hand without the aid of some inserting device because the rivet is made of a soft rubber. Attempting simply to push it through a hole of lesser diameter is more likely to cause the rivet to buckle than to cause it to pass through the hole. At best, it would be inserted into the hole with difficulty. Thus, this invention includes means for forcing a stiff wire or rod through the bore of the rivet to force the outer end of the rivet outwardly while the base is being held. This provides a stiffness and support for the rivet.

The rivet gun is shown in various views in FIGS. 5 through 11. It is preferably made of molded plastic.

FIG. 5 is a perspective view of rivet gun 20 as seen by the user. A rivet 8 is shown in position about to be inserted into gun 20.

Rivet gun 20 includes a housing 22 to which is attached a U-shaped handle 24 (The ends of the "U" are each secured to the housing 22). Handle 24 defines an opening 26 through which a child may insert his fingers and a slidable trigger 28. In operation a child squeezes trigger 28 and causes it to telescope or slide into the upper portion 29 of handle 24.

At the end of housing 22 (opposite to that of handle 24) rivet gun 20 has a pair of rivet grasping jaws 32 and 33 mounted for longitudinal movement in a bezel or gun cap 36. Jaws 32 and 33 move in and out of cap 36 upon actuation of trigger 28, such motion serving to open and close jaws 32 and 33 around the base 16 of rivet 8. Insertion wire 38, sized to fit within bore 12 of rivet 18, can be seen positioned centrally of jaws 32 and 33.

In general, the gun operates by having jaws 32 and 33 grasp rivet 8 about base 16 and pull the rivet toward gun 20 thus causing insertion wire 38 to pass into bore 12 to the end of the bore and to stretch and distend rivet 8 lengthwise. This serves to reduce the outer diameter of shaft 10 so that the rivet may be inserted in one of the holes 4 to join the plates and bars 2 and 3.

Jaws 32 and 33 are linked to trigger 28 such that when a child squeezes on trigger 28, i.e. moves it to the left as shown in FIGS. 6, 7, and 9, jaws 32 and 33 are moved in the same direction as the trigger and inwardly of bezel 36. This results because trigger 28 is adapted to slide within handle 24.

The internal structure of rivet gun 20 is best seen in FIGS. 7 and 9. Stiff wire 38 is positioned along the axis of gun 20 so that it can enter the bore of rivet 8. It is held against longitudinal movement relative to housing 22 by a right-angle bend at position 39 where it enters a molded pocket 40. Its axial portion is held in its desired position by an axially-slidable positioning piece 42 with an axial bore that surrounds wire 38. Piece 42 is linked with jaws 32 and 33 and so slides along wire 38 as trigger 28 is pulled. It can be seen that pulling of trigger 28 serves to draw jaws 32 and 33 inwardly relative to cap 36, but, at the same time, stiff wire 38 is held in its central position so that it may enter rivet 8.

In the opposite side of opening 26, housing 22 has an inner wall 44 adjacent a spring compartment 46. Compartment 46 contains a compressible spring 48 adapted to be compressed by spring pressure member 50 which abuts the inner surface of wall 44 and slidably enters spring compartment 46 at its rearward end. Thus, when trigger 28 is squeezed, pressure member 50 presses against spring 48 compressing it. Comparably, when pressure is released on trigger 28, spring 48, pressing against pressure member 50, serves to bring trigger 28 to its normal position outside the upper portion 29 of handle 24.

Wire 38, fixed in holding pocket 40, is held fixed relative to spring compartment 46. Thus, as trigger 28 is squeezed and jaws 32 and 33 are drawn into bezel or gun cap 36, there is relative motion between jaws 32 and 33 and insertion wire 38. Wire 38 moves in a direction to the right relative to the jaws, as viewed in FIGS. 7 and 9.

If desired, a locking mechanism may be provided to hold rivet gun in its cocked position with a rivet 8 locked in jaws 32 and 33 and wire 38 distending the rivet. This holding can be accomplished in several ways, but the preferable design includes having a latch 54 mounted on the inner surface of housing 22 and adjacent spring compartment 46. Latch 54 is spring pressed toward compartment 46 and has a beveled surface 56 at such an angle as to engage with a complementary downwardly projecting beveled surface 58 on the outer surface of compartment 46. As shown in FIG. 7, surface 56 has an inner engaging catch portion 57 at its left edge, and surface 58 has an inner engaging catch portion 59 on its right-hand edge. Accordingly, when trigger 28 is pulled into a substantially retracted position, catches 57 and 59 engage to hold rivet gun 20 in its cocked position. Also mounted on spring compartment 46, to the right of catch 58, is a second beveled surface 62 having a greater diameter than that of surfaces 58 in catch 59. By retracting trigger 28 even farther, surface 56 engages with surface 62 and so disengages the interlocking catches 57 and 59. Release of trigger 28 will allow the gun to go to its fully uncocked position because catches 57 and 59 will not interengage as the gun moves to its uncocked position under the pressure of spring 48.

Operation

The operation has been described above.

To view it, however, the objective is for the child to assemble and disassemble whatever structure he wishes to make by use of a "riveting" system. This system involves having a child place a rivet 8 into the jaws 32 and 33 of gun 20 and pull the trigger 28, pulling rivet 8 into the gun and closing the jaws of the gun about the base 16 of the rivet. Wire 38 enters rivet 8 and extends it, narrowing it in diameter to less than the diameter of the holes 4 in bars and plates 2. When trigger 28 is retracted sufficiently, the gun is in its cocked position with engaging catches 57 and 59 interlocked. The child may then insert the rivet into whichever holes in the bars or plates he wishes so as to firmly interengage them. Slight additional retraction of trigger 28, followed by its release, allows the rivet to be released in the hole, the jaws to be released, and stiff wire 38 to be removed.

Upon release, the external diameter of body 10 of rivet 8 enlarges to fill the hole and the plates and bars are held together by the frictional contact of the shaft against the inside surfaces of holes 4, the expanded portion of body 10 of shaft 10 at one end of the rivet, and the step 18 on the base 16 at the other end of the rivet.

To remove the rivet, the jaws 32 and 33 are placed about the head of base 16 in the space between base 16 and the plate or bar created by step 18, and the trigger is again pulled. This causes the jaws to clamp about base 16 and stiff wire 38 to be inserted into the bore 10, distending rivet 8 and so reducing its diameter. The rivet may then be removed. Release of the rivet from the gun is accomplished in the same manner as would be done were the rivet in one of the holes 4.

It should be noted that the step 18 on base 16 of rivet 8 serves to provide a gap between base 16 and the structural bars or plates so that the jaws 32 and 33 may easily be inserted. In the absence of this space, a child might have difficulty forcing the jaws between the plates or bars and the inside surface of base 16. It should also be noted that the base 16 must have sufficient strength so that it will not flex and release the rivet as wire 38 enters the bore and distends the rivet.

I claim:

1. In a toy constructon system of the type including structural elements having preformed alignable holes through which fasteners are fitted to join the structural elements together, the improved fastener comprising:
a reusable rivet element formed of distensible material and adapted to fit in said alignable holes to join said structural elements together, said rivet element having an elongated body of substantially uniform cross-section throughout its length with a relaxed diameter greater than the diameter of said holes in said structural elements and a diameter, when distended longitudinally, less than the diameter of said holes, an enlarged generally coaxial base at one end of sufficient rigidity to permit said base to be held during the application of a longitudinal distending force to said rivet body sufficient to produce said lesser diameter, an internal bore extending through said base and body to the opposite end of the rivet element, said opposite end being closed and of sufficient strength to receive a longitudinal distending force, applied to the rivet element through said bore, sufficient to reduce said relaxed diameter to a diameter less than that of said holes, and a shoulder on said elongated body next to said base for spacing the base a predetermined distance from a structural element.

2. A toy construction system as claimed in claim 1 wherein said reusable rivet elements are formed with a cylindrical body and base and a tapered end opposite the base to guide insertion of the rivet element into a hole.

3. A toy construction system as claimed in claim 1 wherein the reusable rivet element has an elongated body with a relaxed length greater than the combined thickness of said base and said shoulder.

* * * * *